United States Patent

[11] 3,615,800

[72] Inventors Ernst Spietschka
 Oberauroff;
 Walter Deucker, Lorsbach, Taunus, both of Germany
[21] Appl. No. 735,985
[22] Filed June 11, 1968
[45] Patented Oct. 26, 1971
[73] Assignee Farbwerke Hoechst Aktiengesellschaft vormals Meister, Lucius & Bruning Frankfurt am Main, Germany
[32] Priority June 19, 1967
[33] Germany
[31] F 52723

[54] PROCESS FOR CONVERTING PERYLENE-3,4,9,10-TETRACARBOXYLIC ACID DIIMIDE INTO A PIGMENT FORM HAVING VALUABLE COLORISTIC PROPERTIES
 3 Claims, No Drawings

[52] U.S. Cl. .................................................... 106/228 Q, 106/309

[51] Int. Cl. .................................................... C08h 17/14
[50] Field of Search ............................................ 106/288, 309; 260/281

[56] References Cited
UNITED STATES PATENTS

| 3,043,843 | 7/1962 | Koch | 260/281 |
| 3,346,551 | 10/1967 | Anton | 260/152 |

FOREIGN PATENTS

| 956,515 | 3/1963 | Great Britain | 106/288 |

Primary Examiner—Tobias E. Levow
Assistant Examiner—J. V. Howard
Attorney—Curtis, Morris & Safford ABSTRACT: Process for converting perylene-3,4,9,10-tetracarboxylic -tetracarboxylic acid diimide into a pigment having valuable by grinding the peryleneimide in inert organic solvents at a temperature of up to about 50°C.

PROCESS FOR CONVERTING PERYLENE-3,4,9,10-TETRACARBOXYLIC ACID DIIMIDE INTO A PIGMENT FORM HAVING VALUABLE COLORISTIC PROPERTIES

Perylene-3,4,9,10-tetracarboxylic acid diimide (perylimide) is a very valuable pigment dyestuff having in coatings of varnishes and plastics an extremely high fastness to light, weather, overspraying and bleeding.

As has been pointed out in the German Pat. No. 1,115,711, the dry and wet grinding processes known from literature and generally practiced have, so far, not led to any pigment of valuable coloristic properties, since the dyestuff shows in a finely divided form an unusually strong tendency to produce solidly caked aggregates and agglomerates which cannot be broken down again in the processes which are generally in use for dyeing varnishes and plastics.

Dissolving the perylimide in concentrated sulfuric acid, monohydrate or oleum, and introducing it subsequently into water or dissolving and recrystallization in anhydrous phosphoric acid fail, since even by this method the finely dispersed pigment cakes together again, when still wet, to big secondary particles which are worthless for dyeing and have a hard grain. Attempts were therefore made to overcome the aforementioned difficulties by treating the finely dispersed wet perylimide additionally with solvents (German Pat. No. 1,115,711). By this method, the sulfuric acid solution of the dyestuff is added to water, whereupon the wet press cake, which has been washed neutral, is heated with nitrobenzene, added by emulsifiers, to the boil until the water has been distilled off completely.

According to the process of the German Pat. No. 1,142,339, the wet press cake of the perylimide obtained by sulfuric acid finish is dried after addition of about 20 percent of an oil-soluble polar compound and 1-2 percent of a water-soluble dispersing agent.

The products obtained according to the process of both the aforementioned Patents show, in dyeing varnishes or plastics, a comparatively low strength of color and a cloudy shade. The coatings of varnishes have moreover a matte, lusterless surface. The content of added emulsifiers and dispersing agents also has limited the use of perylimide in the field of varnishes.

It has now been found that perylene-3,4,9,10-tetracarboxylic acid diimide (perylimide) can be transformed into a pigment form having valuable coloristic properties by grinding perylene-3,4,9,10-tetracarboxylic acid imide, obtained according to known methods, in organic solvents which are inert under the conditions of the process of the present invention at a temperature of up to about 50° C., preferably between about 10° and about 30° C. Whereas in the process of the present invention the upper limit of temperature lies at about 50° C., the lower limit of temperature may vary widely. Thus, according to the present invention, the process can be carried out for example at −10° C.

As suitable organic solvents there may be mentioned for instance aliphatic and cycloaliphatic alcohols and ketones, such as methanol, ethanol, isopropanol, cyclo-hexanone, amyl alcohol, cyclo-hexanol, acetone, or cycle-hexanone, moreover aliphatic and aromatic hydrocarbons, such as ligroine, cyclohexane, toluene or xylol, saturated or unsaturated aliphatic hydrocarbons, such as carbon tetrachloride or ethylene chloride and halogenated or nitrated aromatic hydrocarbons, such as chlorobenzene or nitrobenzene as well as mixtures of the above-mentioned solvents. Saturated aliphatic alcohols of one to about five carbon atoms are preferred.

As for the quantity of the organic solvent to be used, it may also vary within the wide limits. Preferably, the raw perylimide is treated with an about 3- to about 5-fold amount by weight of an organic solvent though a far greater excess of the solvent may be used. Objections to the use of substantially bigger amounts of the solvent are mainly the evaporation required by relatively great quantities of solvents and a longer grinding time. Inversely, the proportion by weight of raw perylimide to organic solvent may be for example 1:2, 1:1, or 1:<1. How far the quantity of the solvents can be reduced depends for example also on the grinding plant used in each case.

Grinding of the raw perylimide in the inert organic solvent is effected for example in a porcelain mill or a continuously running mill with quartz beads of for example 1 to 3 mm. diameter or with corresponding steel scrap. Grinding is continued until the optimal color strength is obtained. Instead of quartz beads or steel scrap there may also be used other grinding elements. When choosing them it should be taken into consideration, however, that they are resistant to abrasion. The grinding elements may vary widely in size. Generally, increasing their size requires a longer grinding time.

The working up of the material to be ground is done as usual by filtering off the dyestuff suspension from the grinding elements, by drawing off the organic solvent from the pigment and by drying finally the moist press cake in vacuo at a temperature of up to 70° C. The organic solvent can also be separated from the finely dispersed pigment for example by a falling-film evaporator or by a tumbling dryer.

The perylimide used as raw pigment can be prepared for example either by melting naphthalene-1,8,-dicarboxylic acid imide, acenaphthenequinone-monoxime or -dioxime with potassium hyroxide (German Pat. No. 276,357) or by condensing perylene-3,4,9,10-tetracarboxylic acid or its anhydride with ammonia (German Pat. No. 386,057).

As to the perylimide used as raw product, it is of advantage to apply large crystalline perylimide, which has been recrystallized from sulfuric acid, or perylimide which has been purified by stirring out with hot concentrated sulfuric acid.

If, unlike as in the process described in the German Pat. No. 386,057, perylene-3,4,9,10-tetracarboxylic acid, its anhydride or ammonium salt is condensed with ammonia or ammonium chloride at 120° to 125° C. and not at 200° to 230° a perylimide forms in practically quantitative yield which, subjected to the treatment of the present invention, shows in full tone coatings of varnishes a distinctly higher glaze and in lighter coatings of varnish a shade which is considerably more red than pigments prepared from the aforementioned perylimide raw products by the same grinding process. The fastness properties of the highly glazed product correspond to those of the other perylimide pigments which produce in full tone coatings of varnish very mass colorations.

The product obtained according to the process of the present invention is far superior to the perylimide pigments known hitherto with concern to the color strength and purity of shade, while the fastness properties to light, bleeding and overspraying are the same. For example the product obtained by the process of the present invention is characterized, compared to the pigment obtained according to the process described in the German Pat. No. 1,115,711, in comparative coats of lacquers and plastics by a color strength which is almost twice as high and by a greater purity of shade, the coats of lacquers having moreover a considerably higher surface luster.

Compared to the known methods applied hitherto with perylimide, the process of the present invention represents also a technical progress. Thus, because of the abolition of the sulfuric acid finish, there is practically no burdensome wastewater. Drying of the dyestuff and recovering of the organic solvent used are effected in one operation. Furthermore, the new grinding process can be carried out very easily in usual apparatus. Finally, it may work easily entirely continuously and is, compared to the processes known so far, very timesaving.

Considering the behavior known so far of the perylimide in a finely dispersed state and considering the methods used up to now to prevent considerable caking of the finely dispersed pigment particles it must be considered a surprise that, by grinding, according to the process of the present invention in an organic solvent, a pigment is obtained which is with regard to the color strength for superior to the perylimide products known so far. The grinding of a raw pigment in an organic solvent which has already been applied with cuprous phthalocyanine-pigments is used in this pigment series with a view to obtaining a certain modification of the crystals of the finely dispersed pigment, though moreover, compared to other known processes of finely dispersing, no improvement of the color strength is obtained.

Example 1

100 Grams of 1,8-naphthalene-dicarboxylic acid imide are heated with 500 g. of sodium hydroxide for 15 minutes to 290° to 300° C. The product is then dissolved in water, into which air is conducted. The dyestuff is drawn off, washed, dried and stirred with 350 g. of concentrated sulfuric acid for 1 hour at 80° to 100° C. After addition of 160 g. of sulfuric acid 50 percent, the dyestuff which has precipitated is drawn off, washed and dried. 30 Grams of the perylimide obtained are ground at room temperature with 90 g. of n-butanol in a mill, having a capacity of half a liter and being fed with 750 g. of quartz beads of 2 to 3 mm. diameter, on a vibrating mill until the tinctorial strength does not increase any more. After discharging the mill, the dyestuff is rinsed from the quartz beads over a strainer by adding further n-butanol and the suspension obtained is brought to dryness in a falling-film evaporator at about 60° C. A well dispersible, pure pigment powder is obtained corresponding by weight almost to the raw pigment used.

Lacquers and certain plastics which can be produced with the pigment powder obtained according to this invention are twice as strong in color and have a purer shade than comparative dyeings obtained with perylimide pigments used hitherto.

Instead of n-butanol, methanol or ethanol may be used with the same result.

Example 2

100 Grams of 1,8-naphthalene-dicarboxylic acid imide are heated with 450 g. of potassium hydroxide and 40 g. of sodium acetate for 2-3 hours at 230°-240° C. The product is then dissolved in water into which air is conducted. Subsequently, the dry dyestuff is drawn off. After washing and drying the dyestuff is stirred with 350 g. of concentrated sulfuric acid for 1 hour at 80°-100° C. After addition of 160 g. of sulfuric acid 50 percent, the precipitated dyestuff is drawn off, washed and dried. 30 Grams of the perylimide obtained are ground with 90 g. of isopropanol in a mill, having a capacity of half a liter and being fed with 750 g. of quartz beads of a 2-3 mm. diameter, on a vibrating mill at 30° C, until the tinctorial strength does not increase any more. The mill is discharged and the dyestuff is rinsed from the quartz beads over a strainer by adding further isopropanol. The dyestuff is separated from the suspension obtained by drawing off and the press cake is dried in vacuo at 50° to 60° C. The pigment powder obtained shows in coatings of lacquers and plastics a tinctorial strength which is almost twice as high as that of the perylimide pigments used so far.

Example 3

100 Grams of perylene-3,4,9,10-tetracarboxylic acid tetraammonium salt are heated with 100 g. of ammonium carbonate in 1 liter of water in an autoclave for 2 hours at 200°-220° C. After drawing off and drying, 30 g. of the perylimide obtained are ground with 90 g. of amyl alcohol in a mill having a capacity of half a liter and being fed with 750 g. of quartz beads of 2-3 mm. diameter, on a vibrating mill at 10° to 15° C, until there is no further increases of the tinctorial power. The mill is discharged, the dyestuff is rinsed from the quartz beads by adding further amyl alcohol and the suspension obtained is brought to dryness in a falling-film evaporator at about 60° C.

60 Parts of the pigment powder obtained show in coatings of lacquers and plastics the same color strength as 100 parts of the perylimide pigments used hitherto.

Example 4

100 Grams of 1,8-naphthalene-dicarboxylic acid imide are heated with 450 g. of potassium hydroxide and 40 g. of sodium acetate for 2-3 hours to 230° to 240° C. Subsequently, the product is dissolved in water. After introducing air, the dyestuff is drawn off, washed and dried. Then 30 g. of the perylimide are ground at room temperature with 90 g. of cyclohexanol in a mill, having a capacity of half a liter and being fed with 750g. of quartz beads of 2-3 mm. diameter, on a vibrating mill, until no further increase of the tinctorial strength can be observed. After discharging the mill, the dyestuff is rinsed from the quartz beads by adding further cyclohexanol and the suspension obtained is brought to dryness at about 60° C. in a falling-film evaporator. The dyeings produced by the pigments obtained in lacquers and plastics are stronger in color and more red as compared to those dyeings produced with the perylimide pigments used till now.

Example 5

150 Grams of perylene-3,4,9,10-tetracarboxylic acid are heated in the form of its tetrapotassium salt with 200 g. of glacial acetic acid and 200 g. of aqueous ammonia (25 percent) in 500 g. of water for 5 hours to 120° to 125° C. After washing and drying, 30 g. of the raw pigment obtained are ground at room temperature with 90 g. of acetone in a mill, having a capacity of half a liter and being fed with 750 g. of quartz beads of 2-3 mm. diameter, on a vibrating mill, until there is no further increase in color strength. After discharging the mill, the dyestuff is rinsed over a strainer from the beads by a further addition of acetone. The dyestuff is then separated from the suspension obtained by drawing off and the press cake is dried in vacuo at 50° to 60° C. 60 Parts of the pigment powder obtained show in coatings produced by lacquers and plastics the same strength of color as 100 parts of the hitherto used perylimide pigment.

The shade of the new pigment is redder than that of the perylimide pigments known so far. When using instead of acetone cyclohexane or cyclohenanone, the result is practically the same.

Example 6

100 Grams of 1,8-naphthalene-dicarboxylic acid imide are heated with 450 g. of potassium hydroxide and 40 g. of sodium acetate for 2-3 hours to 230° to 240° C. The product is subsequently dissolved in water and air is introduced. Then, the dyestuff is drawn off, washed and dried. After recrystallization from concentrated sulfuric acid, 30 g. of the coarsely crystalline perylimide are ground at 25° C. with 90 g. of toluene in a mill, having a capacity of half a liter and being fed with 750 g. of quartz beads of 2-3 mm. diameter, on a vibrating mill until no further increase in color strength can be noticed. After discharge of the mill, the dyestuff is rinsed by adding further toluene from the quartz heads over a strainer and the suspension obtained is brought to dryness in a falling-film evaporator about 60° C.

When grinding is effected instead of in toluene in xylol or nitrobenzene, a perylimide is obtained having properties of practically the same value.

60 parts of the pigment powder obtained show in coatings of lacquers and plastics the same strength of color as 100 parts of the perylimide pigments hitherto in use.

Example 7

100 Grams of 1,8-naphthalene-dicarboxylic acid imide are heated with 450 g. of potassium hydroxide and 40 g. of sodium acetate for 2-3 hours to 230-240° C. The product is then dissolved in water and air is introduced. Then, the dyestuff is filtered off with suction, washed and dried. After recrystallization from concentrated sulfuric acid 30 g. of the coarsely crystalline perylimide are ground at 25° C. with 90 g. of chlorobenzene in a mill, having a capacity of half a liter and being fed with 750 g. of quartz beads of 2-3 mm. diameter, on a vibrating mill until no further increase of the color strength can be noticed. After discharge of the mill, the dyestuff is rinsed from the quartz beads over a strainer by adding further chlorobenzene and the suspension obtained is brought to dryness at about 60° C. in a falling-film evaporator.

Coatings produced with lacquers and plastics containing the pigment powder obtained are of distinctly higher tinctorial power than comparative coatings obtained with the hitherto used perylimide pigments.

Example 8

150 Grams of perylene-3,4,9,10-tetracarboxylic acid anhydride are heated with 200 g. of aqueous ammonia solution 25 percent and 100 g. of ammonium chloride in 2.5 l. of water in an autoclave for 5 hours at 120° to 125° C. After cooling, it is drawn off and washed neutral with water. Thus, 149 g. of raw pigment are obtained. 30 Grams of this raw pigment are ground at 25° C. with 100 g. of isopropanol in a mill, having a capacity of half a liter and being fed with 750 g. of quartz beads of 2-3 mm. diameter, on a vibrating mill until no increase of the color strength can be noticed. After discharging the mill, the dyestuff is rinsed from the quartz beads over a strainer by adding further isopropanol and the suspension obtained is brought to dryness at about 60° C. in a falling-film evaporator.

60 Parts of the pigment powder obtained show in coatings produced by lacquers and plastics the same color strength as 100 parts of the hitherto used perylimide pigments. In fulltone coats of lacquers the glaze of the new pigment is considerably brighter than that of the hitherto used perylimide pigments.

The shade of the new pigment is far redder than that of the known perylimide pigments.

When grinding is effected instead of in isopropanol in ligroine, dimethylformamide, carbon tetrachloride or ethylene chloride, the result obtained is the same.

Example 9

100 Grams of 1,8-naphthalene dicarboxylic acid imide are heated with 500 g. of sodium hydroxide for 15 minutes to 290°-300° C. The product is subsequently dissolved in water. After introducing air, the dyestuff obtained is drawn off, washed and dried. After recrystallization from concentrated sulfuric acid, 30 g. of the coarsely crystalline perylimide are ground at room temperature with a mixture consisting of 60 g. of isopropanol and 30 g. of toluene in a mill, having a capacity of half a liter and being fed with 750 g. of quartz beads of 2-3 mm. diameter, until no further increase in the color strength can be noticed. After discharging the mill, the dyestuff is rinsed from the quartz beads over a strainer by adding further isopropanol and the suspension obtained is brought to dryness in a falling-film evaporator.

60 Parts of the pigment powder obtained show in coatings of lacquers and plastics the same tinctorial strength as 100 parts of the hitherto used perylimide pigments.

Example 10

100 Grams of 1,8-naphthalene-dicarboxylic acid imide are heated with 450 g. of potassium hydroxide and 40 g. of sodium acetate for 2-3 hours at 230°-240° C. and dissolved in water. Subsequently, air is introduced and drawing off is effected. After washing and drying the dyestuff is recrystallized from concentrated sulfuric acid. 30 Grams of the perylimide obtained are ground at −10° C. with 150 g. of isopropanol in a mill having a capacity of half a liter, a cooling jacket and being fed with 750 g. of quartz beads of 2-3 mm. diameter, on a vibrating mill until no further increase of the color strength takes place. After discharging the mill, the dyestuff is rinsed from the quartz beads by adding further isopropanol and the suspension obtained is brought to dryness at about 60° C. in a falling-film evaporator. The dyeings of the pigment powder obtained in lacquers and plastics are considerably stronger in color than comparative dyeings of the perylimide pigments used up to now.

We claim:

1. A process for converting perylene-3,4,9,10-tetracarboxylic acid diimide into a pigment form having valuable coloristic properties which comprises grinding perylene-3,4,9,10-tetracarboylic acid diimide in an inert organic solvent at a temperature between about −10° C. and about 50°50° C.

2. A process according to claim 1, wherein said temperature is between about 10° C. and about 30° C.

3. A process according to claim 1, wherein said solvent is methanol, ethanol, isopropanol, butanol, amyl alcohol, cyclohexanol, acetone, cyclohexanone, dimethyl formamide, ligroine, cyclohexane, benzene, toluene, xylene, chlorobenzene, nitrobenzene, carbon tetrachloride, ethylene chloride or mixtures thereof.

* * * * *